UNITED STATES PATENT OFFICE

2,213,477

GLYCOL AND POLYGLYCOL ETHERS OF ISOCYCLIC HYDROXYL COMPOUNDS

Adolf Steindorff and Gerhard Balle, Frankfort-on-the-Main, Karl Horst, Hofheim in Taunus, and Richard Michel, Krefeld-Uerdingen, Germany, assignors, by mesne assignments, to General Aniline & Film Corporation, New York, N. Y., a corporation of Delaware No Drawing. Application November 18, 1936, Serial No. 111,554. In Germany December 12, 1935

6 Claims. (Cl. 260—613)

This invention relates to glycol and polyglycol ethers of isocyclic hydroxyl-compounds.

We have found that technically valuable glycol and polyglycol ethers are obtainable by combining in an ether-like manner isocyclic hydroxyl-compounds, which have as substituents in the nucleus at least one hydocarbon radical or one acyl radical with at least 4 carbon atoms, with glycols or polyglycol ether chains.

The reaction may be carried out by treating the said substituted isocyclic hydroxyl compounds with alpha-beta-alkylene-oxides of the type

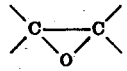

in such a manner that the alkylene oxide enters the substituted isocyclic hydroxyl compound once or several times, i. e. that bodies of the following constitution are obtained:

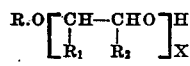

wherein R stands for a member of the group consisting of isocyclic hydrocarbon radicals and substituted isocyclic hydrocarbon radicals which are, furthermore, substituted by at least one member of the group consisting of hydrocarbon radicals with at least 4 carbon atoms and acyl radicals with at least 4 carbon atoms, and wherein $R_1$ and $R_2$ may stand for hydrogen or aliphatic radicals which may belong to one and the same ring systems and X may stand for the whole numbers 1 to 100.

For instance, there may be added an alkylene oxide, in the gaseous or liquid phase, to the melt of a substituted isocyclic hydroxyl compound at a temperature at which the alkylene oxide is absorbed by the hydroxyl compound and which generally lies between about 50° C. and about 250° C.; it is also possible to cause the substituted isocyclic hydroxyl compound to react with an alkylene oxide in a closed vessel; heating may be advantageous also during this operation, at least at the beginning of the reaction. In these reactions the length of the polyglycol ether chain is determined by the proportion of the alkylene oxide caused to react. As catalysers for the formation of the ethers or polyethers there may be used caustic alkalis, alkali alcoholates, tertiary organic bases and the like; furthermore, also acid compounds, for instance, potassium bisulfate.

Previously formed polyglycol ether chains may also be combined with substituted isocyclic hydroxyl compounds, for instance in the following manner: substituted isocyclic hydroxyl compounds in the form of their alkali compounds are caused to react with halogen hydrines, the monoglycolethers of the substituted isocyclic hydroxyl compound obtained are transformed into the chloralkyl ethers, for instance, by treatment with thionyl chloride, and these chloroalkyl ethers of substituted isocyclic hydroxyl compounds are caused to react with polyglycol ethers in the presence of caustic alkalis. In all cases in which, according to the present invention, alkylene oxides are applied, there may also be used the halogen hydrines corresponding to the alkylene oxides. The alkylene oxides may be set free from these halogen hydrines.

As examples of substituted isocyclic hydroxyl compounds, which may be used as starting materials for the invention, the following are named:

Normal butylphenol, isobutyl-ortho-cresol, di-isobutylphenol, isoamylcresols, isohexylxylenols, isooctylphenol, isooctyl-ortho-chlorophenol, isooctyl-beta-naphthol, isononylresorcinol, isododecylphenols, isododecylcyclohexanol, normal dodecylphenol, normal octadecylphenol, normal undecyl-para-oxyphenylketone of the formula $C_{17}H_{35}CO.C_6H_4OH$, n-heptadecyl-para-oxyphenylketone of the formula $C_{17}H_{35}CO.C_2H_4OH$, ortho- and para-benzylphenol, cyclohexyl-ortho-cresol, para-oxydiphenyl, para-oxyphenyl-camphane, the corresponding condensation products of phenol or the cresols with diterpenes and the like.

Besides the compounds mentioned there may be used isocyclic hydroxyl compounds which are obtained in the form of technical mixtures. The substituted isocyclic hydroxyl compounds may be prepared in various ways. For instance, olefinic compounds may be caused to react in known manner with aromatic hydroxyl compounds. In this case there may be used definite olefines, for instance, isobutylene, di-isobutylene, normal dodecylene, cyclo-hexane, camphene or the like or also the olefine-mixtures obtained, for instance, by dehydrating the mixtures of primary alcohols of about $C_4$ to about $C_8$ produced in the reduction of carbon mono-oxide by means of certain catalysts or by catalytic polymerisation by one of the known methods of low-molecular olefines, such as ethylene, propylene, isobutylene or the like or of olefines obtained from the primary alcohols of $C_4$—$C_8$ produced in the reduction of carbon monoxide.

Aromatic hydroxyl compounds may also be condensed with halogen containing compounds of any kind, for instance, with pinene-hydrochloride, isobutylchloride, with halogenated natural or synthetic hydrocarbon oils such as petroleum— or synthetic benzine-fractions, halogenated brown-coal-tar-fractions and the like. As catalysts there may be used those usually applied for this kind of reactions, for instance, aluminium chloride, ferric chloride, zinc chloride, aluminium powder, zinc dust and so on.

Substituted aromatic hydroxyl compounds, suitable for the present invention, may also be obtained by the known condensation of aromatic hydroxyl compounds with alcohols, for instance, tertiary butylalcohol, the alcohols of about $C_4$ to $C_8$, which as above mentioned, are produced in the catalytic reduction of carbon monoxide, cyclohexanol, methylcyclohexanols or others.

The substituted hydroaromatic hydroxyl compounds, which are also used as starting materials, may easily be obtained according to known methods, for instance, by catalytic hydrogenation of the substituted aromatic hydroxyl compounds, mentioned in the preceding paragraph, in the presence of a hydrogenation catalyst.

As examples of alkylene oxides which are used in the reaction of substituted isocyclic hydroxyl compounds, the following are named: ethylene oxide, propylene oxide, butylene oxide, butylene dioxide, cyclohexene oxide, glycide, epichlorhydrine or the like.

The new polyglycol ethers are oily to fatty or wax-like products. They are in part insoluble in water, in part they form with water more or less stable emulsions and in part they are soluble in water. These solubility properties depend upon the kind of the alkylene oxide used and the length of the polyglycol ether chain formed. The solutions and emulsions, respectively, are stable to acids and to alkalis and to the agents causing the hardness of water.

The hydroxyl groups contained in the new polyglycol ethers may be caused to react with reactive compounds. In this way, for instance, the water-insoluble polyglycol ethers may be rendered water-soluble.

The water-insoluble or water-soluble glycol or polyglycol ethers which fall within the scope of this invention may further be treated with polybasic inorganic or organic acids to form products which still contain acid groups which may be neutralized, or the polyglycol ethers may react with organic carboxylic or sulfonic acids which contain a reactive halogen atom to form ether carboxylic or sulfonic acids or their salts.

The new products have capillary active properties of different degree depending upon the nature and the length of the polyglycol ether chain and the consequent degree of solubility and dispersive power in water. By these properties the products are suitable for use in various branches of the industry, for instance, as wetting agents, softening agents or auxiliary agents for the finishing of textiles, as dispersing, emulsifying, washing or cleansing agents, as agents for producing foam; furthermore, as auxiliary agents for various purposes in the dyeing industry, for instance, as through-dyeing agents, levelling agents or the like. Particularly important is the good washing power which the products have on textiles of all kinds and which by far could not be obtained, hitherto, with synthetic products. The new products may be used either alone or in admixture with other textile assistants, with agents preventing the precipitation on the fiber of insoluble inorganic salts caused by the hardness of water, with bleaching agents, diluents or the like.

As suitable adjuvants there may be used, for instance, aliphatic, hydroaromatic and aromatic sulfonic acids, especially in the form of their water-soluble salts, for instance, sulfonation products of heavy benzene, solar oil, solvent-naphtha, naphthalene; furthermore, sulfonation products of the said kind which may be condensed either with themselves or by means of methylene groups, alkyl groups, benzyl groups or the like. There may also be used the sulfonation products of Edelenau extract, naphthenes or naphthenic acids; furthermore, the sulfonation products produced in the purification of petroleum, benzine etc. with sulfuric acid. There are, likewise, suitable the sulfonation products of fatty character, for instance, the products of the Turkey red oil series, sulfonates of fatty alcohols, ester- or amide-like compounds of fatty acids with oxy- or amino-alkyl- or arylsulfonic acids or the like. Further suitable adjuvants are those having carboxyl groups such as fatty acid-, resin-acid- or naphthene-acid-salts; furthermore, benzoic acid or phthalic acid salts, reaction products of fatty acid chlorides with sarcosine, albuminous hydrolysates, aromatic amino carboxylic acids, tartaric acid, salicylic acid or the like. If desired, there may be added to these mixtures further adjuvants, for instance, water-soluble salts of phosphoric acids such as, alkalipyrophosphates or -metaphosphates, other inorganic salts, for instance, those used for altering the pH-value of the mixture, such as, sodium carbonate, waterglass or pure diluents such as sodium sulfate or sodium chloride, bleaching agents or the like.

It is remarkable that the new products when mixed with the said additions may be obtained also in the form of loose powders easily to be dosed.

The following examples illustrate the invention, but they are not intended to limit it thereto, the parts being by weight:

(1) 206 parts of para-isooctylphenol (obtainable by condensing phenol with di-isobutylene) are melted and 2 parts of a caustic soda solution of 40 per cent. strength are added thereto. Ethylene oxide is introduced, while stirring, at a temperature of 120°–130° C. until 10 mols. of ethylene oxide per one mol. of para-iso-octylphenol have been absorbed, namely until a total weight of 646 parts is attained. The oily product thus obtained is soluble in cold water to a clear solution; the solutions foam very strongly.

Instead of para-isooctylphenol there may be used the mixture of alkylphenols obtained by condensing phenol with the technical polymerization product of isobutylene containing besides di-iso-butylene tri-iso-butylene and other olefines.

There is dissolved in 1 liter of water 0.5 gram of an iso-octylphenylpolyglycol ether having a polyglycol radical consisting of 10 molecular proportions of glycol. On cotton a very good washing effect is obtained which may even be improved by adding 0.25 gram of sodium carbonate to each liter of the washing liquor.

By causing only 6 mols. of ethylene oxide to act according to the process described above upon isooctylphenol an oil is obtained which is soluble in water except for a slight turbidity and which is an excellent cleansing agent for woolen fabrics. 470 parts of this isooctylphenylpolyglycol ether having a polyglycolether chain consisting of 6 mols. of glycol are dissolved in 600 parts of ether and 120 parts of chlorosulfonic acid are added to this solution at about 10° to about 20° C. while well stirring. The dissolved hydrogen chloride is eliminated by blowing in dry air; thereupon, the solution is diluted with ice water and rendered feebly alkaline to phenolphthalein by means of caustic soda solution at a temperature not exceeding +30° C. The sodium salt of the acid sulfuric acid ester of an isooctylphenyl-polyglycol ether with an average content of 6 glycol radicals dissolves in water to a clear solution. The product constitutes a very good wetting agent for wool and cotton.

By causing 10 mols. of ethylene oxide to act according to the above described manner upon isooctyl-ortho-cresol at about 160° to about 170° C., an oily isooctyl-ortho-cresylpolyglycol ether soluble in water is obtained. Cotton laundry goods are washed in the usual manner with a solution containing 0.175 gram of isooctyl-ortho-cresyl-polyglycol ether containing about 10 glycol radicals in the molecule, 1 gram of sodium pyrophosphate and 0.2 gram of sodium metaphosphate per liter. The purifying effect is also very good in case of very soiled laundry goods.

Dirty cotton flaps are washed at 95° C. during half-an-hour, then rinsed at 40° C. for two minutes and in the cold for further two minutes. As washing and rinsing water there is used water having 8° of German hardness.

Washing bath:

(a) Containing per liter 4.2 grams of isooctyl-phenyl-polyglycol ether (10 mols. of ethylene oxide);

(b) Containing per liter 4.2 grams of water-soluble albumin hydrolysate caused to react with oleic acid chloride;

(c) Containing per liter 4.2 grams of the mixture of the products according to (a) and (b) in the proportion of 1:3.

Used washing solution (the dirt deposits on the walls of the vessel):

(a) Nearly uncolored;
(b) Somewhat dirty;
(c) Very dirty.

Purifying effect after rinsing and drying:

(a) Nearly good;
(b) Bad;
(c) Good.

The washing process is carried out as described above. As washing agents there are compared:

(a) 4.2 grams of the reaction products of isooctylphenol with 10 mols. of ethylene oxide per liter and 2 grams per liter of sodium carbonate;

(b) 4.2 grams per liter of glue partly degraded by means of hydrochloric acid and neutralized and 2 grams of sodium carbonate per liter;

(c) 4.2 grams per liter of a mixture of the products of (a) and (b) in the proportion of 1:3 and 2 grams of sodium carbonate per liter.

The washing solution is most soiled when the mixture (c) is used and least dirtied when (b) is used.

Purifying effect:

(a) Good;
(b) Bad;
(c) Very good.

A washing agent consisting of a mixture of 1 part of the reaction product of isooctylphenol and 12 mols. of ethylene oxide, 2 parts of calcined sodium carbonate and 3 parts of the reaction product of sodium cellulose and ethylene oxide and sodium chloroethane sulfonate, is dissolved in a quantity of 3 grams per liter of water of 8° German hardness in order to be used as washing agent for washing white goods. The washing effect is similarly goods as that obtained with 5 grams per liter of a soap powder consisting of:

| | Per cent |
|---|---|
| Soap | about 30 |
| Cryst. sodium carbonate | about 70 |

Solid washing agents capable of being strewn, but containing a large quantity of polyglycol ether mostly in a liquid form, are obtained by using, as additional substances, glue, decomposed glue or water-soluble derivatives of cellulose, for instance, reaction products of sodium cellulose and the sodium salt of chloroacetic acid or the sodium salt of chloroethanesulfonic acid. 15 parts of the liquid body obtained from 1 mol. of isooctylphenol and 10 mols. of ethylene oxide may be brought into a form easily capable of being strewn and of being packed in paper, by mixing them with 5 parts of the solid water-soluble reaction product of sodium cellulose and ethylene oxide and sodium chloroethane-sulfonate and by adding 20 parts of sodium carbonate. The sodium carbonate may be replaced wholly or partly by perborate or similar substances, also by bicarbonate or stoichiometrical mixtures of sodium superoxide and bicarbonates. 4 parts of the washing agent thus composed are equivalent in their washing effect to 6 parts of the usual commercial bleaching washing powders.

Comparative tests show the following results: Household white goods are soaked in a solution containing sodium carbonate and then washed in a Miele-washing apparatus with the following solutions.

(a) Washing agent consisting of:

| | Parts |
|---|---|
| Soap (80 per cent strength) | 40 |
| Calcined sodium carbonate | 19 |
| Crystallized sodium perborate | 7 |
| Calcined sodium pyrophosphate | 14 |
| Sodium silicate | 2 |
| Water of crystallization | 18 |
| | 100 |

(b) Washing agent consisting of:

| | Parts |
|---|---|
| Reaction product of 1 mol. of isooctylphenol and 12 mols. of ethylene oxide | 6 |
| Sodium salt of butylnaphthalene sulfonic acid | 4 |
| Calcined sodium carbonate | 32 |
| Calcined sodium pyrophosphate | 13 |
| Sodium silicate | 5 |
| Crystallized sodium perborate | 7 |
| Magnesium sulfate | 2 |
| Sodium sulfate | 22 |
| Water of crystallization | 9 |
| | 100 |

(c) Washing agent as under (b), but containing instead of the sodium salt of butyl-naphthalene sulfonic acid the reaction product from oleic acid chloride and the sodium salt of oxethanesulfonic acid or from oleic acid chloride and the sodium salt of methylaminoethanesulfonic acid.

(d) Washing agent as under (b), but containing instead of the sodium salt of butylnaphthalene sulfonic acid the sodium salt of the sulfuric acid ester of oleylalcohol.

The goods have been washed in boiling water of 12° German hardness, the proportion of the goods to the liquor being 1:7, washing agent 10 grams per liter. Foaming effect: (b), (c) and (d) better than with (a). Washing effect: (b), (c) and (d) better than with (a), although there is present only the fourth part of effective substance (organic washing agent properly speaking), used in (a).

1 kilo of a mixture from 100 grams of dry pancreas of cattle, 900 grams of sodium carbonate, 300 grams of isooctylphenylpolyglycol ether (obtained from isooctylphenol and 8–10 mols. of ethylene oxide) are dissolved in 300 liters of water of 35–40° C. About 60 kilos of dry laundry goods are washed for 30–40 minutes with this solution in a washing-machine. Thereupon, the goods are rinsed. If desired, a further washing operation with soap or another washing agent without addition of enzyme may be added.

Instead of pancreas enzymes, other enzymes of different origin, for instance from plants or micro-organisms may be used.

By mixing isooctylphenylpolyglycolether with about 10 mols of glycol in the ether radical with solvents, for instance, turpentine oil, alcohols (butanols, amyl alcohol) and water, washing agents are obtained which purify in an excellent manner wool and cotton soiled very much by oil during the process of manufacture.

(2) 262 parts of isododecylphenol which may be obtained by condensing phenol with a mixture of polymerization products of propylene or propylene-containing gases consisting to a more or less high percentage of unsaturated hydrocarbons of 12 carbon atoms are treated (as described in Example 1) with ethylene oxide in the presence of about 1 per cent of a caustic soda solution. The solutions become turbid when to about 15 mols. of ethylene oxide per one mol. of iso-dodecylphenol are absorbed. About 800 to about 900 parts of a butter-like mass are obtained which dissolves in cold water to a clear solution. The solutions become turbid when heated to boiling temperature and clarify again on cooling.

A similar product is obtained according to the following process:

260 parts of isododecylphenol, prepared by condensation of phenol with iso-dodecylchloride in the presence of aluminium chloride or a catalyst of similar action, are mixed with 1 part of sodium methylate; thereupon, ethylene oxide is introduced at 140–160° C. until the increase in weight amounts to about 670 parts. The product obtained dissolves in water to a clear solution and represents in a neutral bath an effective washing agent for cotton.

The iso-dodecylchloride is prepared by monochlorination of a light oil fraction essentially containing hydrocarbons having 12 carbon atoms.

A product with the same properties may be obtained as follows:

250 parts of an alkylated cresol mixture, which is obtained by causing crude cresol containing ortho-, meta- and para-cresol to react with monochlorination products of a middle oil fraction boiling at 160–220° C. in the presence of a catalyst such as $AlCl_3$ or $ZnCl_2$, are treated with 2 parts of caustic soda solution of 40 per cent strength and condensed with 600 parts of ethylene oxide. The final product dissolves in water to a clear solution and possesses properties similar to those of the product described in the preceding paragraph.

Household laundry goods are soaked in known manner in a solution containing per 10 liters of water about 25 grams of crystallized sodium carbonate and 9 grams of a dodecylphenylpolyglycol ether having about 12 to 14 glycol radicals in the molecule. After rinsing the laundry goods are brought into a washing solution, containing per liter 0.9 gram of the above-mentioned dodecylphenylpolyglycol ether, 5 grams of crystallized sodium carbonate and 1 gram of sodium perborate. When the laundry goods have been introduced the whole is slowly heated to boiling and boiled for 15 to 20 minutes. Then the goods are rinsed in the usual manner.

1 gram of a dodecylcyclohexylpolyglycolether containing about 15 mols. of glycol and which is prepared by the action of ethylene oxide on a dodecylcyclohexanol obtainable from, for instance, one of the above cited isododecylphenols or of undecyl-para-oxyphenylketone

$$C_{11}H_{23}COC_6H_4OH$$

by hydrogenation in known manner, dissolved in 1 liter of water, yields on wool and cotton in a neutral bath or a bath rendered alkaline by means of sodium carbonate a very good purifying effect.

Household laundry goods are washed, for comparative purposes, in a Miele-washing apparatus with the following washing solutions which contain per liter 8 grams of the washing agent, the water having 12° German hardness, the proportion of the goods to the liquor being 1:7.

Washing agent (a) (powder) consisting of:

| | Parts |
|---|---|
| Reaction product from 1 mol of isododecylphenol and 14 mols. of ethylene oxide | 12 |
| Calcined sodium carbonate | 25 |
| Crystallized sodium perborate | 7 |
| Magnesium sulfate | 2 |
| Sodium sulfate | 54 |

Washing agent (b) (powder) consisting of:

| | Parts |
|---|---|
| Reaction product from 1 mol. of isododecylphenol and 14 mols. of ethylene oxide | 9 |
| Sodium salt of acid sulfuric acid ester of an ether which is obtained by reaction of 1 mol. of isododecylphenol and 2 mols of ethylene oxide | 3 |
| Calcined sodium carbonate | 25 |
| Crystallized sodium perborate | 7 |
| Magnesium sulfate | 2 |
| Sodium sulfate | 54 |

By comparing the washing processes it has been ascertained that the foaming effect is much better with solution (b) than with (a), the purifying effect being about the same. Since a quantity of foam as large as possible is desired for preventing the laundry goods from being damaged, solution (b) is to be preferred.

(3) 178 parts of isohexylphenol are mixed with 0.5 part of caustic alkali powder. The whole is heated to about 130–135° C. and the water formed is removed under reduced pressure, while stirring. Thereupon, ethylene oxide is introduced into the melt, while well stirring, during which operation care must be taken, that the temperature of the reaction mass is maintained between 180° C. and 200° C. When about 300 parts of ethylene oxide are taken up, the reaction is interrupted. A water-soluble oil is obtained.

Wool piece goods greased with olive oil are washed with a solution containing 4 grams of this polyglycol ether and 1 gram of sodium carbonate per liter of water. The purifying effect is excellent.

(4) 358 parts of a compound of the formula:

wherein $R_1$ stands for an acyl radical of oleic acid, are mixed with 3 parts of sodium ethylate and the mixture is heated in an iron pressure vessel with 300 parts of ethylene oxide to 90° C.–100° C.; the temperature is maintained until the originally existing pressure has disappeared. Thereupon, this treatment is repeated, using each time 300 parts of ethylene oxide until, 1100 parts of ethylene oxide have been absorbed. The fatty mass obtained dissolves in cold water to a clear solution.

A product of similar action is obtained, by causing according to one of the methods mentioned in the preceding examples about 700 parts of ethylene oxide to act upon 276 parts of a compound of the formula $C_{11}H_{23}CO.C_6H_4.OH$ (undecyl-para-oxyphenyl-ketone).

Woolen piece goods greased with olive oil are washed in a solution containing per liter of water 4 grams of this polyglycol ether of the compound $C_{11}H_{23}CO.C_6H_4.OH$ and 1 gram of sodium carbonate, whereby an excellent purifying effect is obtained.

(5) 150 parts of isobutylphenol are mixed with 15 parts of a sodium methylate solution of 10 per cent strength in methyl alcohol, the mixture is heated to 130° C.–140° C. and the methyl alcohol is removed under reduced pressure while stirring; thereupon, 132 parts of ethylene oxide are introduced at 150° C.–160° C. pari passu with the absorption of the oxide. An oil is obtained which is capable of being emulsified in water and which consists for the main part of isobutylphenyltriglycol ether.

10 grams of a mixture of 95 parts of xylenol and 5 parts of the above described isobutylphenyltriglycol ether are dissolved in 1 liter of mercerization lye containing 30 per cent. of caustic soda solution. The wetting and shrinking effect on cotton fabric is very good.

(6) 600 parts of crude decylphenol (obtained by condensation of crude decyl chloride and phenol) are exposed, with addition of 20 parts of caustic soda solution of 46° Bé. at 120° C.–140° C., for about 15 hours to ethylene oxide gas until 1320 parts of ethylene oxide are absorbed. The product is used as washing agent in the form of an aqueous solution of 35 per cent strength, if desired in the presence of sodium carbonate or a similar substance.

(7) 660 parts of ethylene oxide are caused to act on 270 parts of isododecylcyclohexanol prepared, for instance, by catalytical hydrogenation of isododecyl phenol in the presence of finely divided nickel at about 130° C. to about 160° C. and a hydrogen pressure of about 50 to about 120 atmospheres above atmospheric pressure.

1 gram of isododecyl-cyclohexylpolyglycol ether (containing 15 mols of glycol) dissolved in 1 liter of water yields on wool and cotton in a neutral bath or a bath rendered alkaline by means of sodium carbonate a very good purifying effect.

(8) 220 parts of isononylphenol prepared by condensation of phenol with an olefine mixture obtained by polymerization of propylene and containing essentially isononylenes are caused to react according to one of the above described methods with 350 parts of ethylene oxide. A polyglycol ether is obtained which is soluble in or capable of being emulsified with water.

For greasing wool a dispersion of 4 grams of isononylphenylpolyglycol ether (containing 8 mols of glycol) is used. A wool material which may be worked up extremely well is obtained.

As further examples for the preparation of suitable polyglycol ethers there may be mentioned the following:

(9) 290 parts of an alkylphenol, to be regarded as mainly tetradecylphenol—obtainable by first introducing 3 parts of boron fluoride into 280 parts of molten phenol and then introducing at 25° C.–30° C., 588 parts of an olefine having the boiling point of 212–217° C. and consisting mainly of the hydrocarbon $C_{14}H_{28}$ and subsequently stirring for about 2 hours at the same temperature— are mixed with 2.5 parts of caustic soda solution of 40° Bé. The whole is heated to 130° C. and 528 parts of ethylene oxide are then introduced. The reaction product is a semi-solid water-soluble mass.

If the treatment with ethylene oxide is interrupted after about 132 parts of ethylene oxide have been absorbed a water-insoluble oil is obtained. This may be converted into a water-soluble product, for instance by reaction with a sulfonating agent or with a halogen carboxylic acid.

(10) Into 288 parts of an alkylphenol which is obtained by adding 940 parts of molten phenol to a solution of 67 parts of boron fluoride in 36 parts of water and then adding at 40–45° C. 1940 parts of an olefine having the boiling range of 180° C.–220° C. and an average molecular weight of 194 and further stirring for 2 hours, there is introduced under the conditions described in Example 9 a mixture of 15 per cent. of propylene oxide and 85 per cent. of ethylene oxide until the polyether formed is soluble in water. The product is a semi-solid mass.

A similar product is obtained by using as parent material the nuclear hydrogenation product of the said alkylphenol, obtainable by treating the alkylphenol with hydrogen under pressure in the presence of a hydrogenation catalyst, for instance, nickel, at a raised temperature.

The mixture of olefines used for the production of this polyglycolether may be prepared by polymerizing olefines with 6 or 7 carbon atoms obtainable from the corresponding alcohols of the catalytical reduction of carbon monoxide.

(11) 439 parts of an alkylnaphthol having as substituent a radical of about 21 carbon atoms, obtainable by condensing with beta-naphthol a trimeric isoheptylene obtained by dehydrating and polymerizing the alcohols produced in the catalytic reduction of carbon monoxide, are mixed with 1 part of powdered caustic potash and the mixture is heated under reduced pressure to a temperature of 130° C.–150° C. in order to eliminate the water formed. Then 660 parts of ethylene oxide are introduced at 140° C.–160° C. There is obtained a wax-like mass which forms stable emulsions with water.

If 1100 parts of ethylene oxide are reacted with 439 parts of the said alkylnaphthol there is obtained a wax-like mass which dissolves in water to a clear solution.

(12) 206 parts of iso-octylphenol, prepared by condensing di-isobutylene with phenol in the presence of boron-fluoride, are mixed with 0.7 part of powdered caustic soda and heated to 120° C.–130° C. under reduced pressure until the product is anhydrous. Propylene oxide is then introduced at a temperature between 160° C. and 180° C. until 1160 parts have been absorbed. An oily product is obtained which may be worked up with water into a stable emulsion.

If the reaction is interrupted after 580 parts of propylene oxide have been absorbed, a water-insoluble oil is obtained. This oil may be made soluble in water by converting it into an acid sulfuric acid ester, for instance, as follows:

786 parts of the iso-octylphenylpolyoxypropyl ether are dissolved in 1000 parts of ether and 120 parts of chlorosulfonic acid are slowly introduced into the solution, while well stirring, at a temperature of about 15° C. to about 20° C. The hydrochloric acid gas formed is then removed by means of a weak current of air. The ethereal solution is diluted with ice water, the whole is made weakly alkaline to phenolphthalein by means of caustic soda solution, the ether is first evaporated and then the aqueous solution is evaporated to dryness. There is obtained the sodium salt of the iso-octylphenylpolyoxypropyl ether sulfonate in the form of a vitreous water-soluble mass.

(13) 262 parts of isododecylphenol, prepared by condensing a propylene polymerization product containing chiefly isododecylene with phenol with the aid of a catalyst known for this purpose, are mixed with 2.5 parts of sodium methylate and heated to 150° C.–160° C. 740 parts of glycide are then slowly added drop by drop, while stirring. After complete reaction a water-soluble oil is obtained.

The properties of solubility of this polyether may be changed by esterifying or etherifying the free OH-groups by stages, for instance, with acetic acid or dimethyl sulfate or the like.

Instead of the aforesaid isododecylphenol there may also be used an isododecylphenol which is obtained by monochlorinating a natural or synthetical hydrocarbon oil fraction containing chiefly $C_{12}$ hydrocarbons and condensing the resulting alkyl chloride with phenol.

(14) 182 parts of para-cyclohexylcyclohexanol are mixed with 1.8 parts of caustic soda solution of 40° Bé. The mixture is heated to 140° C.–160° C. and propylene oxide is then introduced until 175 parts have been absorbed. A bright water-insoluble oil is obtained.

If it is desired to render the product soluble in water, 356 parts of the oily polyether are converted into the alcoholate with the equivalent amount of sodium in xylene. The suspension of the alcoholate is then heated to boiling, while stirring, with 150 parts of sodium chloracetate. After removing the solvent there remains a solid product which contains the sodium salt of the cyclohexylcyclohexyltripropylene-glycol-hydroxyacetic acid.

(15) 222 parts of isooctylresorcinol are caused to react, according to one of the above processes, with about 530 parts of ethylene oxide. A product soluble in water and having a good foaming power in water is obtained.

(16) 262 parts of tri-isobutylphenol

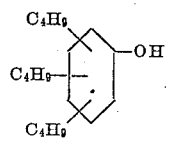

are treated with 220 parts of ethylene oxide according to the described methods. There is obtained a polyglycol ether containing in the polyglycol radical about 5 etheneoxy groups. From the oily product which may only be emulsified with water there is obtained according to the method given in Example 1 the corresponding sulfuric acid ester. The sodium salt of this ester is a product which is soluble in water to a clear solution. These solutions foam very strongly and are suitable for washing woolen, cotton and rayon fabrics.

In an analogous manner there may also be prepared phosphoric acid esters of the above mentioned alkylphenylpolyglycol ether. Corresponding organic acid derivatives may be prepared in the following manner: 482 parts of the above named triisobutylphenylpolyglycol ether are mixed with 135 parts of diglycolic acid anhydride:

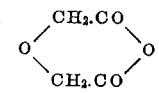

The mixture is heated to about 100° C. until a sample is soluble in a dilute solution of sodium carbonate. The reaction product which corresponds to the formula:

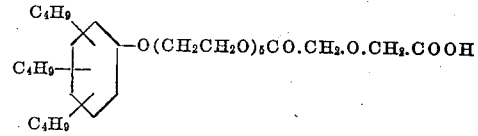

is neutralized. There is obtained a water-soluble cleansing agent.

The tri-iso-butylphenylpolyglycol ether or other polyglycol ethers which fall within the scope of this invention may be converted into organic acid derivatives, i. e., by reacting the sodium or potassium alcoholates of the polyglycol ethers with chloracetic acid or beta-chloropropionic acid or chloroethane sulfonic acid or the like to form the corresponding ether carboxylic acids or ether sulfonic acids or their salts.

We claim:

1. The products of the general formula:

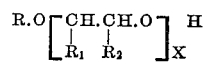

wherein R means an isocyclic ring system which is substituted at least once by a member of the group consisting of hydrocarbon radicals with at least 4 carbon atoms and acyl radicals with at least 4 carbon atoms, $R_1$ and $R_2$ stand for a member of the group consisting of H, aliphatic radicals and aliphatic radicals being members of the same ring system, X stands for a figure of the group 6 to 100, the number X increasing with the number of carbon atoms in the nuclear hydrocarbon or acyl substituent, the number in any event being sufficiently large to render the products soluble in water, the products being of oily to waxy consistency and stable against acids, alkali lyes and the ions which cause the hardness of water, and having capillary activity.

2. The products of the general formula:

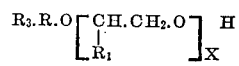

wherein R stands for an isocyclic hydrocarbon radical, $R_3$ means a member of the group consisting of alkyl and cycloalkyl radicals of at least 4 carbon atoms and mixtures thereof, $R_1$ stands for a member of the group consisting of H, alkyl radicals and alkyl radicals substituted by OH, and X stands for a figure of the group 6 to 100, the number X increasing with the number of carbon atoms in the nuclear hydrocarbon substituent $R_3$, the number in any event being sufficiently large to render the products soluble in water, the products being of oily to waxy consistency and stable against acids, alkali lyes and the ions which cause the hardness of water, and having capillary activity.

3. The products of the general formula:

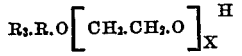

wherein R stands for an aromatic hydrocarbon radical, $R_3$ means a member of the group consisting of alkyl and cycloalkyl radicals of at least 4 carbon atoms and mixtures thereof, and X stands for a figure of the group 6 to 25, the number X increasing with the number of carbon atoms in the nuclear hydrocarbon substituent $R_3$, the number in any event being sufficiently large to render the products soluble in water, the products being of oily to waxy consistency and stable against acids, alkali lyes and the ions which cause the hardness of water, and having capillary activity.

4. The products of the general formula:

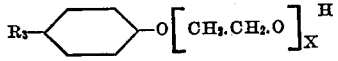

wherein $R_3$ means a member of the group consisting of alkyl and cycloalkyl radicals of at least 4 carbon atoms and mixtures thereof, and X stands for a figure of the group 6 to 25, the number X increasing with the number of carbon atoms in the nuclear hydrocarbon substituent $R_3$, the number in any event being sufficiently large to render the products soluble in water, the products being of oily to waxy consistency and stable against acids, alkali lyes and the ions which cause the hardness of water, and having capillary activity.

5. The products of the formula:

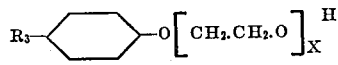

wherein $R_3$ stands for a member of the group consisting of alkyl and cycloalkyl radicals containing from about 8 to about 20 carbon atoms and mixtures thereof, X stands for a figure of the group 8 to 25, the number X increasing with the number of carbon atoms in the nuclear hydrocarbon substituent $R_3$, the number in any event being sufficiently large to render the product soluble in water, the products being of oily to waxy consistency and stable against acids, alkali lyes and the ions which cause the hardness of water, and having capillary activity.

6. The products of the formula:

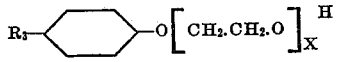

wherein $R_3$ stands for a member of the group consisting of alkyl and cycloalkyl radicals containing from about 8 to 20 carbon atoms and mixtures thereof, X stands for a figure of the group 20 to 25, the number in any event being sufficiently large to render the products soluble in water, the products being of oily to waxy consistency and stable against acids, alkali lyes and the ions which cause the hardness of water and having capillary activity.

ADOLF STEINDORFF.
GERHARD BALLE.
KARL HORST.
RICHARD MICHEL.